(12) United States Patent
Friedman

(10) Patent No.: US 9,352,231 B2
(45) Date of Patent: *May 31, 2016

(54) APPARATUS FOR CONTROLLING THREE-DIMENSIONAL IMAGES

(71) Applicant: AT&T INTELLECTUAL PROPERTY I, LP, Atlanta, GA (US)

(72) Inventor: Lee Friedman, Alpharetta, GA (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,345

(22) Filed: Jun. 16, 2015

(65) Prior Publication Data

US 2015/0273332 A1    Oct. 1, 2015

Related U.S. Application Data

(63) Continuation of application No. 13/860,818, filed on Apr. 11, 2013, now Pat. No. 9,086,778, which is a continuation of application No. 12/868,185, filed on Aug. 25, 2010, now Pat. No. 8,438,502.

(51) Int. Cl.

| | |
|---|---|
| *G06F 15/00* | (2006.01) |
| *G06F 13/00* | (2006.01) |
| *A63F 13/55* | (2014.01) |
| *G06F 3/0484* | (2013.01) |
| *G06F 3/0488* | (2013.01) |
| *G06T 19/20* | (2011.01) |
| *G06F 3/0481* | (2013.01) |

(Continued)

(52) U.S. Cl.
CPC ............. *A63F 13/55* (2014.09); *A63F 13/35* (2014.09); *A63F 13/537* (2014.09); *G06F 3/04815* (2013.01); *G06F 3/04845* (2013.01); *G06F 3/04883* (2013.01); *G06T 19/20* (2013.01); *G06T 2219/2016* (2013.01)

(58) Field of Classification Search
CPC .................... G06F 3/04845; G06F 3/04883
USPC .................. 715/848, 852, 851, 864, 762–765
See application file for complete search history.

(56) References Cited

U.S. PATENT DOCUMENTS

| | | |
|---|---|---|
| 2,832,821 A | 4/1958 | Du Mont |
| 4,649,425 A | 3/1987 | Pund |

(Continued)

OTHER PUBLICATIONS

Edwards, , "Active Shutter 3D Technology for HDTV", PhysOrg. com; 12 pages; Sep. 25, 2009; http://www.physorg.com/news173082582.html; web site last visited May 10, 2010.

*Primary Examiner* — Kevin Nguyen
(74) *Attorney, Agent, or Firm* — Guntin & Gust, PLC; Robert Gingher

(57) ABSTRACT

A system that incorporates teachings of the present disclosure may include, for example, computer-readable storage medium having computer instructions to receive from a media processor one or more scaling characteristics of a three-dimensional (3D) image, present a user interface (UI) for controlling a presentation of the 3D image at a presentation device communicatively coupled to the media processor, wherein the UI is adapted to the scaling characteristics of the 3D image, detect a manipulation of the UI, and transmit to the media processor instructions for adapting the presentation of the 3D image at the presentation device according to the detected manipulation of the UI. Other embodiments are disclosed.

20 Claims, 16 Drawing Sheets

(51) Int. Cl.
*A63F 13/35* (2014.01)
*A63F 13/537* (2014.01)

(56) References Cited

U.S. PATENT DOCUMENTS

| | | |
|---|---|---|
| 5,012,351 A | 4/1991 | Isono |
| 5,293,529 A | 3/1994 | Yoshimura et al. |
| 5,353,269 A | 10/1994 | Kobayashi et al. |
| 5,392,266 A | 2/1995 | Kobayashi et al. |
| 5,465,175 A | 11/1995 | Woodgate |
| 6,014,164 A | 1/2000 | Woodgate |
| 6,115,177 A | 9/2000 | Vossler |
| 6,144,375 A | 11/2000 | Jain et al. |
| 6,188,442 B1 | 2/2001 | Narayanaswami |
| 6,243,054 B1 | 6/2001 | DeLuca |
| 6,285,368 B1 | 9/2001 | Sudo |
| 6,535,241 B1 | 3/2003 | McDowall |
| 6,559,813 B1 | 5/2003 | DeLuca |
| 6,654,721 B2 | 11/2003 | Handelman |
| 6,725,463 B1 | 4/2004 | Birleson |
| 6,859,549 B1 | 2/2005 | Oliensis |
| 6,924,833 B1 | 8/2005 | McDowall |
| 6,965,381 B2 | 11/2005 | Kitamura |
| 7,106,358 B2 | 9/2006 | Valliath et al. |
| 7,204,592 B2 | 4/2007 | O'Donnell |
| 7,245,430 B2 | 7/2007 | Kobayashi et al. |
| 7,391,443 B2 | 6/2008 | Kojima et al. |
| 7,613,927 B2 | 11/2009 | Holovacs |
| 7,785,201 B2 | 8/2010 | Hashimoto |
| 7,813,543 B2 | 10/2010 | Modén |
| 8,111,282 B2 | 2/2012 | Cutler et al. |
| 8,117,281 B2 | 2/2012 | Robinson et al. |
| 8,254,668 B2 | 8/2012 | Mashitani |
| 8,305,914 B2 | 11/2012 | Thielman et al. |
| 8,370,873 B2 | 2/2013 | Shintani |
| 8,416,278 B2 | 4/2013 | Kim et al. |
| 8,436,888 B1 | 5/2013 | Baldino et al. |
| 8,438,502 B2 * | 5/2013 | Friedman ............ G06F 3/04845 715/848 |
| 8,456,507 B1 | 6/2013 | Mallappa et al. |
| 8,552,983 B2 | 10/2013 | Chiu |
| 8,675,067 B2 | 3/2014 | Chou et al. |
| 2002/0009137 A1 | 1/2002 | Nelson |
| 2002/0122145 A1 | 9/2002 | Tung |
| 2002/0122585 A1 | 9/2002 | Swift et al. |
| 2003/0043262 A1 | 3/2003 | Takemoto |
| 2003/0128273 A1 | 7/2003 | Matsui |
| 2003/0132951 A1 | 7/2003 | Sorokin et al. |
| 2003/0214630 A1 | 11/2003 | Winterbotham |
| 2003/0223499 A1 | 12/2003 | Routhier |
| 2003/0231179 A1 | 12/2003 | Suzuki |
| 2004/0013252 A1 | 1/2004 | Craner et al. |
| 2004/0027452 A1 | 2/2004 | Yun |
| 2004/0104864 A1 | 6/2004 | Nakada |
| 2004/0109093 A1 | 6/2004 | Small-Stryker |
| 2004/0218104 A1 | 11/2004 | Smith |
| 2004/0233275 A1 | 11/2004 | Tomita et al. |
| 2005/0041736 A1 | 2/2005 | Butler-Smith et al. |
| 2005/0066165 A1 | 3/2005 | Peled et al. |
| 2005/0084006 A1 | 4/2005 | Lei |
| 2005/0123171 A1 | 6/2005 | Kobayashi et al. |
| 2005/0169553 A1 | 8/2005 | Maurer |
| 2005/0185711 A1 | 8/2005 | Pfister |
| 2005/0190180 A1 | 9/2005 | Jin et al. |
| 2005/0270367 A1 | 12/2005 | McDowall |
| 2006/0046846 A1 | 3/2006 | Hashimoto |
| 2006/0109200 A1 | 5/2006 | Alden |
| 2006/0139312 A1 | 6/2006 | Sinclair et al. |
| 2006/0161410 A1 | 7/2006 | Hamatani et al. |
| 2006/0203085 A1 | 9/2006 | Tomita |
| 2006/0252978 A1 | 11/2006 | Vesely |
| 2006/0274197 A1 | 12/2006 | Yoo |
| 2007/0039032 A1 | 2/2007 | Goldey et al. |
| 2007/0052672 A1 | 3/2007 | Ritter et al. |
| 2007/0153122 A1 | 7/2007 | Ayite |
| 2007/0171275 A1 | 7/2007 | Kenoyer |
| 2007/0242068 A1 | 10/2007 | Han |
| 2007/0263003 A1 | 11/2007 | Ko |
| 2007/0266412 A1 | 11/2007 | Trowbridge |
| 2007/0296721 A1 | 12/2007 | Chang et al. |
| 2008/0015997 A1 | 1/2008 | Moroney et al. |
| 2008/0024454 A1 | 1/2008 | Everest |
| 2008/0044079 A1 | 2/2008 | Chao et al. |
| 2008/0062125 A1 | 3/2008 | Kitaura |
| 2008/0080852 A1 | 4/2008 | Chen |
| 2008/0100547 A1 | 5/2008 | Cernasov |
| 2008/0151092 A1 | 6/2008 | Vilcovsky et al. |
| 2008/0199070 A1 | 8/2008 | Kim et al. |
| 2008/0247610 A1 | 10/2008 | Tsunoda |
| 2008/0247670 A1 | 10/2008 | Tam et al. |
| 2008/0256572 A1 | 10/2008 | Chen |
| 2008/0303896 A1 | 12/2008 | Lipton |
| 2008/0310499 A1 | 12/2008 | Kim |
| 2009/0033737 A1 | 2/2009 | Goose et al. |
| 2009/0046895 A1 | 2/2009 | Pettersson et al. |
| 2009/0096858 A1 | 4/2009 | Jeong et al. |
| 2009/0100474 A1 | 4/2009 | Migos |
| 2009/0122134 A1 | 5/2009 | Joung et al. |
| 2009/0128620 A1 | 5/2009 | Lipton |
| 2009/0160934 A1 | 6/2009 | Hendrickson et al. |
| 2009/0174708 A1 | 7/2009 | Yoda et al. |
| 2009/0278917 A1 | 11/2009 | Dobbins et al. |
| 2009/0310851 A1 | 12/2009 | Arcas et al. |
| 2009/0315977 A1 | 12/2009 | Jung |
| 2009/0319178 A1 | 12/2009 | Khosravy |
| 2009/0327418 A1 | 12/2009 | Zhang et al. |
| 2010/0007582 A1 | 1/2010 | Zalewski |
| 2010/0013738 A1 | 1/2010 | Covannon |
| 2010/0026783 A1 | 2/2010 | Chiu et al. |
| 2010/0039428 A1 | 2/2010 | Kim et al. |
| 2010/0045772 A1 | 2/2010 | Roo et al. |
| 2010/0045779 A1 | 2/2010 | Kwon |
| 2010/0066816 A1 | 3/2010 | Kane |
| 2010/0073468 A1 | 3/2010 | Kutner |
| 2010/0076642 A1 | 3/2010 | Hoffberg |
| 2010/0079585 A1 | 4/2010 | Nemeth |
| 2010/0085416 A1 | 4/2010 | Hegde et al. |
| 2010/0085424 A1 | 4/2010 | Kane et al. |
| 2010/0086200 A1 | 4/2010 | Stankiewicz et al. |
| 2010/0098299 A1 | 4/2010 | Muquit et al. |
| 2010/0103106 A1 | 4/2010 | Chui |
| 2010/0114783 A1 | 5/2010 | Spolar |
| 2010/0134411 A1 | 6/2010 | Tsumura |
| 2010/0150523 A1 | 6/2010 | Okubo |
| 2010/0171697 A1 | 7/2010 | Son et al. |
| 2010/0177161 A1 | 7/2010 | Curtis |
| 2010/0177172 A1 | 7/2010 | Ko |
| 2010/0182404 A1 | 7/2010 | Kuno |
| 2010/0188488 A1 | 7/2010 | Birnbaum et al. |
| 2010/0188511 A1 | 7/2010 | Matsumoto |
| 2010/0192181 A1 | 7/2010 | Friedman |
| 2010/0194857 A1 | 8/2010 | Mentz et al. |
| 2010/0199341 A1 | 8/2010 | Foti et al. |
| 2010/0201790 A1 | 8/2010 | Son |
| 2010/0215251 A1 | 8/2010 | Klein Gunnewiek et al. |
| 2010/0225576 A1 | 9/2010 | Morad |
| 2010/0225735 A1 | 9/2010 | Shaffer et al. |
| 2010/0226288 A1 | 9/2010 | Scott et al. |
| 2010/0235871 A1 | 9/2010 | Kossin |
| 2010/0303442 A1 * | 12/2010 | Newton ............ H04N 13/0033 386/241 |
| 2010/0306800 A1 | 12/2010 | Jung et al. |
| 2010/0309287 A1 | 12/2010 | Rodriguez |
| 2010/0315494 A1 | 12/2010 | Ha et al. |
| 2011/0001806 A1 | 1/2011 | Nakahata |
| 2011/0012896 A1 | 1/2011 | Ji |
| 2011/0012992 A1 | 1/2011 | Luthra |
| 2011/0029893 A1 | 2/2011 | Roberts et al. |
| 2011/0032328 A1 | 2/2011 | Raveendran |
| 2011/0037837 A1 | 2/2011 | Chiba et al. |
| 2011/0043614 A1 | 2/2011 | Kitazato |
| 2011/0050860 A1 | 3/2011 | Watson |
| 2011/0050866 A1 | 3/2011 | Yoo |
| 2011/0050869 A1 | 3/2011 | Gotoh |

(56) References Cited

U.S. PATENT DOCUMENTS

| | | |
|---|---|---|
| 2011/0078737 A1 | 3/2011 | Kanemaru |
| 2011/0085017 A1 | 4/2011 | Robinson et al. |
| 2011/0096155 A1 | 4/2011 | Choo |
| 2011/0109715 A1 | 5/2011 | Jing et al. |
| 2011/0119640 A1 | 5/2011 | Berkes |
| 2011/0119709 A1 | 5/2011 | Kim et al. |
| 2011/0122152 A1 | 5/2011 | Glynn |
| 2011/0128354 A1 | 6/2011 | Tien et al. |
| 2011/0138334 A1 | 6/2011 | Jung |
| 2011/0157329 A1 | 6/2011 | Huang et al. |
| 2011/0164110 A1 | 7/2011 | Fortin et al. |
| 2011/0164122 A1 | 7/2011 | Hardacker |
| 2011/0193946 A1 | 8/2011 | Apitz |
| 2011/0199460 A1 | 8/2011 | Gallagher |
| 2011/0199469 A1 | 8/2011 | Gallagher |
| 2011/0211049 A1 | 9/2011 | Bassali et al. |
| 2011/0221874 A1 | 9/2011 | Oh |
| 2011/0225611 A1 | 9/2011 | Shintani |
| 2011/0228040 A1 | 9/2011 | Blanche et al. |
| 2011/0254921 A1 | 10/2011 | Pahalawatta |
| 2011/0255003 A1 | 10/2011 | Pontual |
| 2011/0258665 A1 | 10/2011 | Fahrny et al. |
| 2011/0267422 A1 | 11/2011 | Garcia et al. |
| 2011/0267437 A1 | 11/2011 | Abeloe |
| 2011/0267439 A1 | 11/2011 | Chen |
| 2011/0271304 A1 | 11/2011 | Loretan |
| 2011/0285828 A1 | 11/2011 | Bittner |
| 2011/0286720 A1 | 11/2011 | Obana et al. |
| 2011/0298803 A1 | 12/2011 | King et al. |
| 2011/0301760 A1 | 12/2011 | Shuster et al. |
| 2011/0304613 A1 | 12/2011 | Thoresson |
| 2011/0310234 A1 | 12/2011 | Sarma |
| 2012/0007948 A1 | 1/2012 | Suh et al. |
| 2012/0026396 A1 | 2/2012 | Banavara |
| 2012/0033048 A1 | 2/2012 | Ogawa |
| 2012/0050507 A1 | 3/2012 | Keys |
| 2012/0075407 A1 | 3/2012 | Wessling et al. |
| 2012/0092445 A1 | 4/2012 | McDowell et al. |
| 2012/0169730 A1 | 7/2012 | Inoue |
| 2012/0169838 A1 | 7/2012 | Sekine |
| 2012/0206558 A1 | 8/2012 | Setton et al. |
| 2012/0249719 A1 | 10/2012 | Lemmey et al. |
| 2012/0274731 A1 | 11/2012 | Shanmukhadas et al. |
| 2012/0327174 A1 | 12/2012 | Hines et al. |
| 2013/0120522 A1 | 5/2013 | Lian et al. |
| 2013/0271560 A1 | 10/2013 | Diao et al. |

\* cited by examiner

500

600

700

800

900

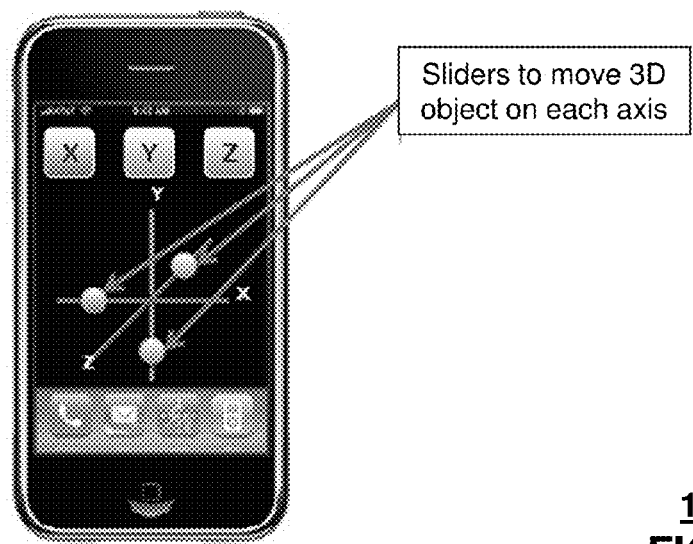
1000
FIG. 10
1100
FIG. 11
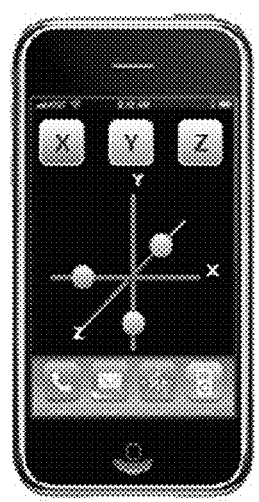
Portrait
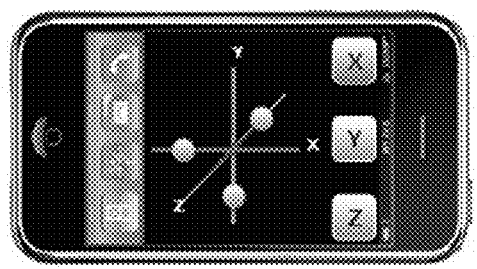
Landscape

Precise Translation Across an Axis
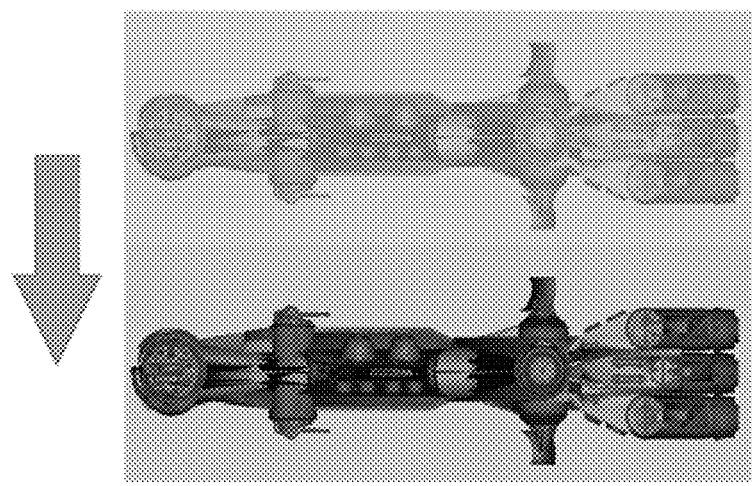
Move a slider from one
position to another
translates the object on
the screen proportionally
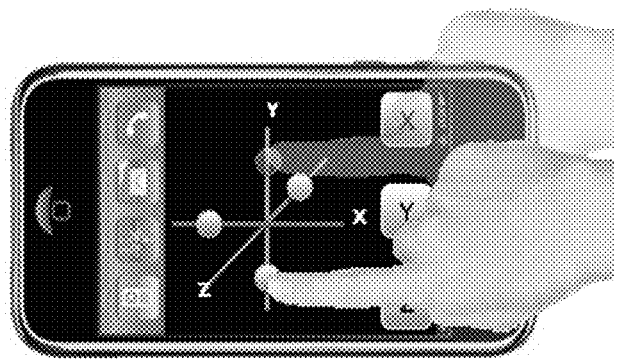
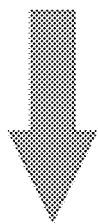
1200
FIG. 12

Multiple Translations Across all Axis
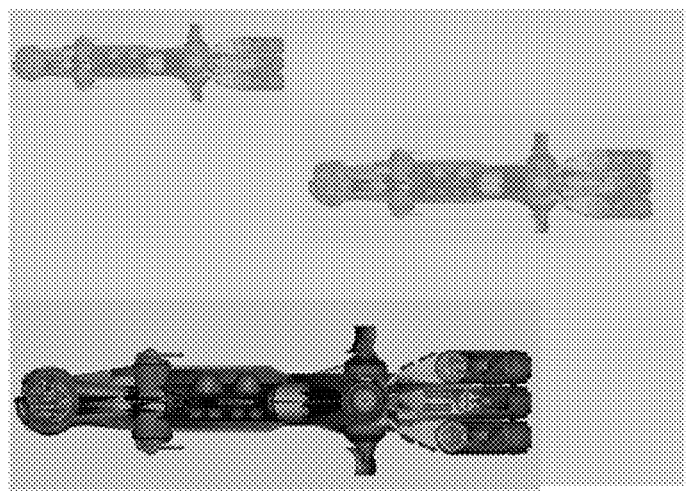
Use 2 fingers to move over the touch panel simultaneously moves the object in the X, Y and/or Z Axis
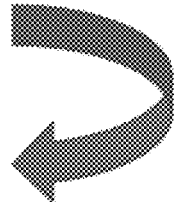
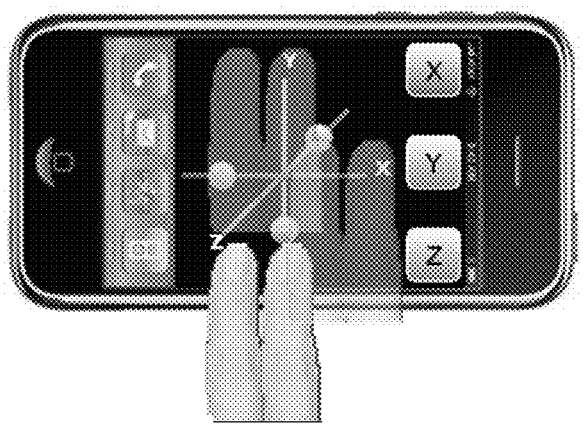
1300
FIG. 13

Calibration Against an Object
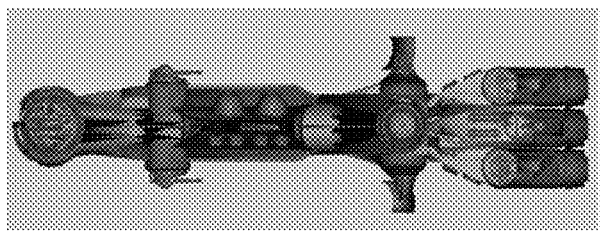
Slide 3 fingers down to calibrate the unit to the object on the screen
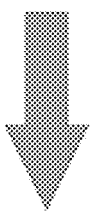
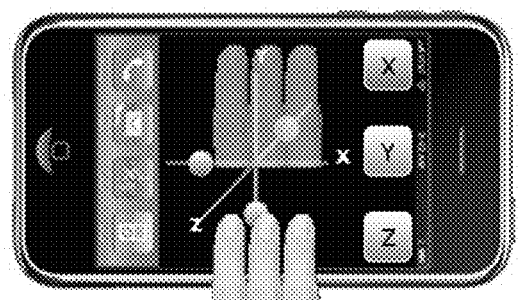
1400
FIG. 14

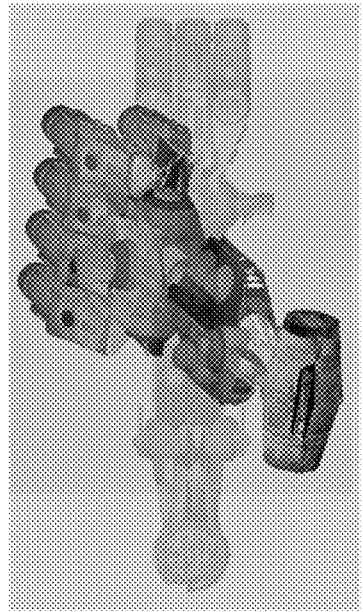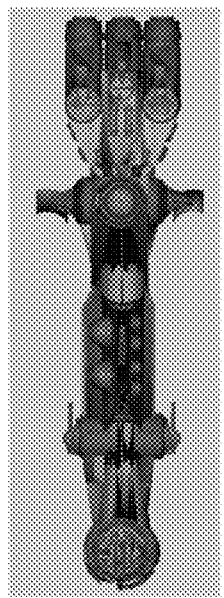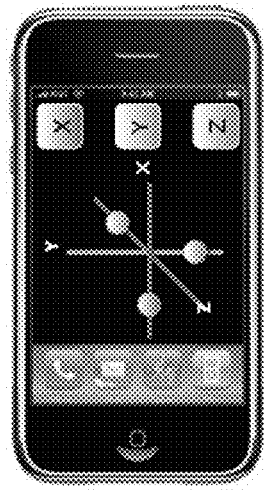
FIG. 17
1700

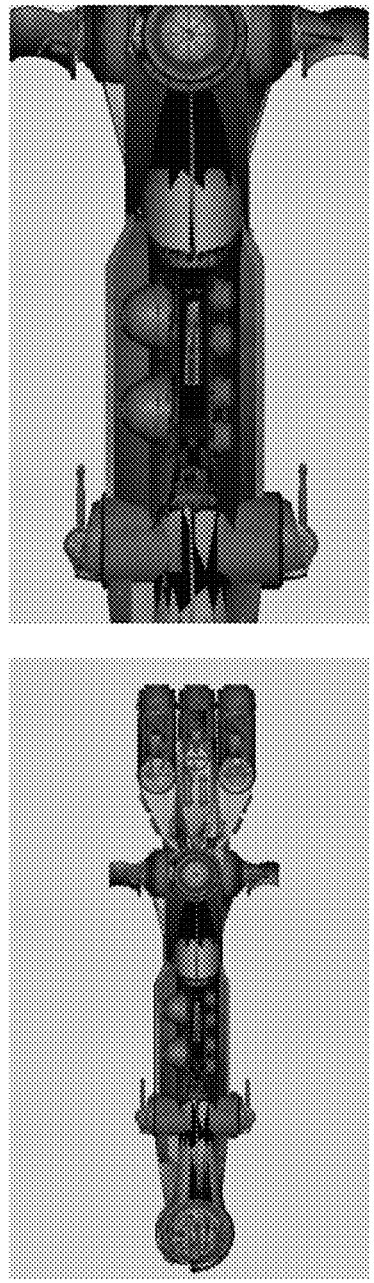
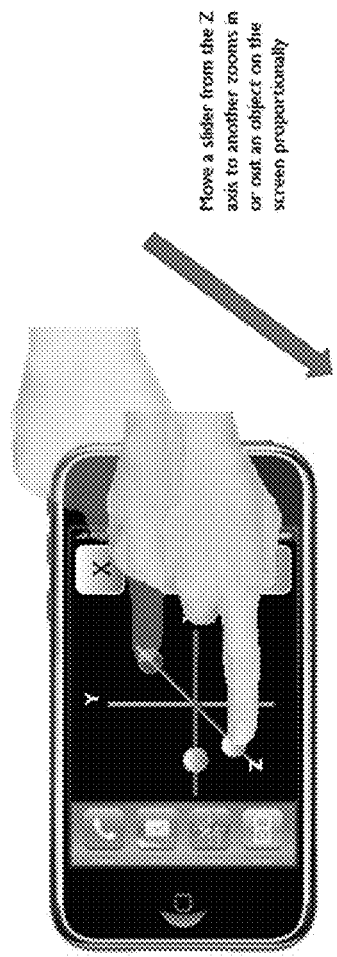
1800
FIG. 18

APPARATUS FOR CONTROLLING THREE-DIMENSIONAL IMAGES

CROSS-REFERENCE TO RELATED APPLICATIONS

This application is a continuation of and claims priority to U.S. patent application Ser. No. 13/860,818, filed Apr. 11, 2013, which is a continuation of U.S. patent application Ser. No. 12/868,185, filed Aug. 25, 2010 (now U.S. Pat. No. 8,438,502), the disclosures of all of which are incorporated herein by reference in their entirety.

FIELD OF THE DISCLOSURE

The present disclosure relates generally to techniques for controlling images and more specifically to an apparatus for controlling three-dimensional images.

BACKGROUND

Media content applications such as gaming applications can generate images with perspectives which in some instances can be or can appear to be three-dimensional. Manipulating depth, orientation or other aspects of such images with common peripherals such as a computer mouse, or a gaming console controller can be challenging for some, and for others with less dexterity unmanageable.

BRIEF DESCRIPTION OF THE DRAWINGS

FIGS. 6-18 depict illustrative embodiments of the method of FIG. 5; and

DETAILED DESCRIPTION

One embodiment of the present disclosure can entail a communication device having a motion sensor, a touch-screen display, and a controller. The controller can be operable to communicatively couple to a media processor operable to present a three-dimensional (3D) image by way of a presentation device communicatively coupled to the media processor, receive from the media processor one or more scaling characteristics of the 3D image, present at the touch-screen display a user interface (UI) for controlling a presentation of the 3D image at the presentation device, detect by way of the touch-screen display a manipulation of the UI, and transmit to the media processor instructions for adapting the presentation of the 3D image at the presentation device according to the detected manipulation of the UI. The UI can be adapted to the scaling characteristics of the 3D image.

One embodiment of the present disclosure can entail a computer-readable storage medium having computer instructions to receive from a media processor one or more scaling characteristics of a 3D image, present a UI for controlling a presentation of the 3D image at a presentation device communicatively coupled to the media processor, detect a manipulation of the UI, and transmit to the media processor instructions for adapting the presentation of the 3D image at the presentation device according to the detected manipulation of the UI.

One embodiment of the present disclosure can entail a media processor having a controller operable to transmit to a communication device one or more scaling characteristics of a 3D image, and receive instructions from the communication device for adapting a presentation of the 3D image at a presentation device communicatively coupled to the media processor. The communication device can be operable to present a UI for controlling the presentation of the 3D image at the presentation device according to the one or more scaling characteristics of the 3D image, detect a manipulation of the UI, and transmit to the media processor the instructions for adapting the presentation of the 3D image at the presentation device according to the detected manipulation of the UI.

Figure 1:
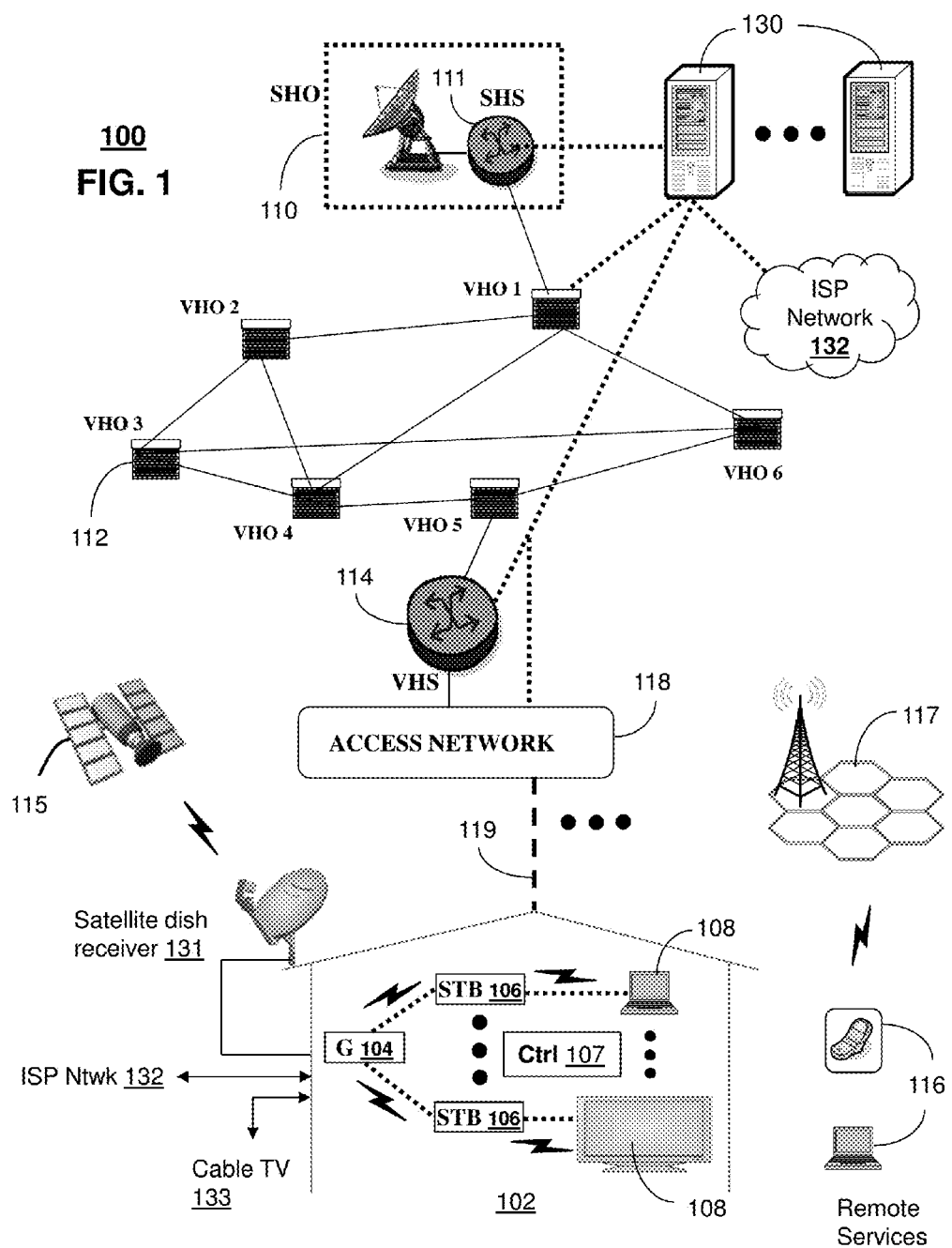
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can function as an image processing system (herein referred to as image processing system 130). The image processing system 130 can use common computing and communication technology to adapt a presentation of three-dimensional (3D) images at a presentation device.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
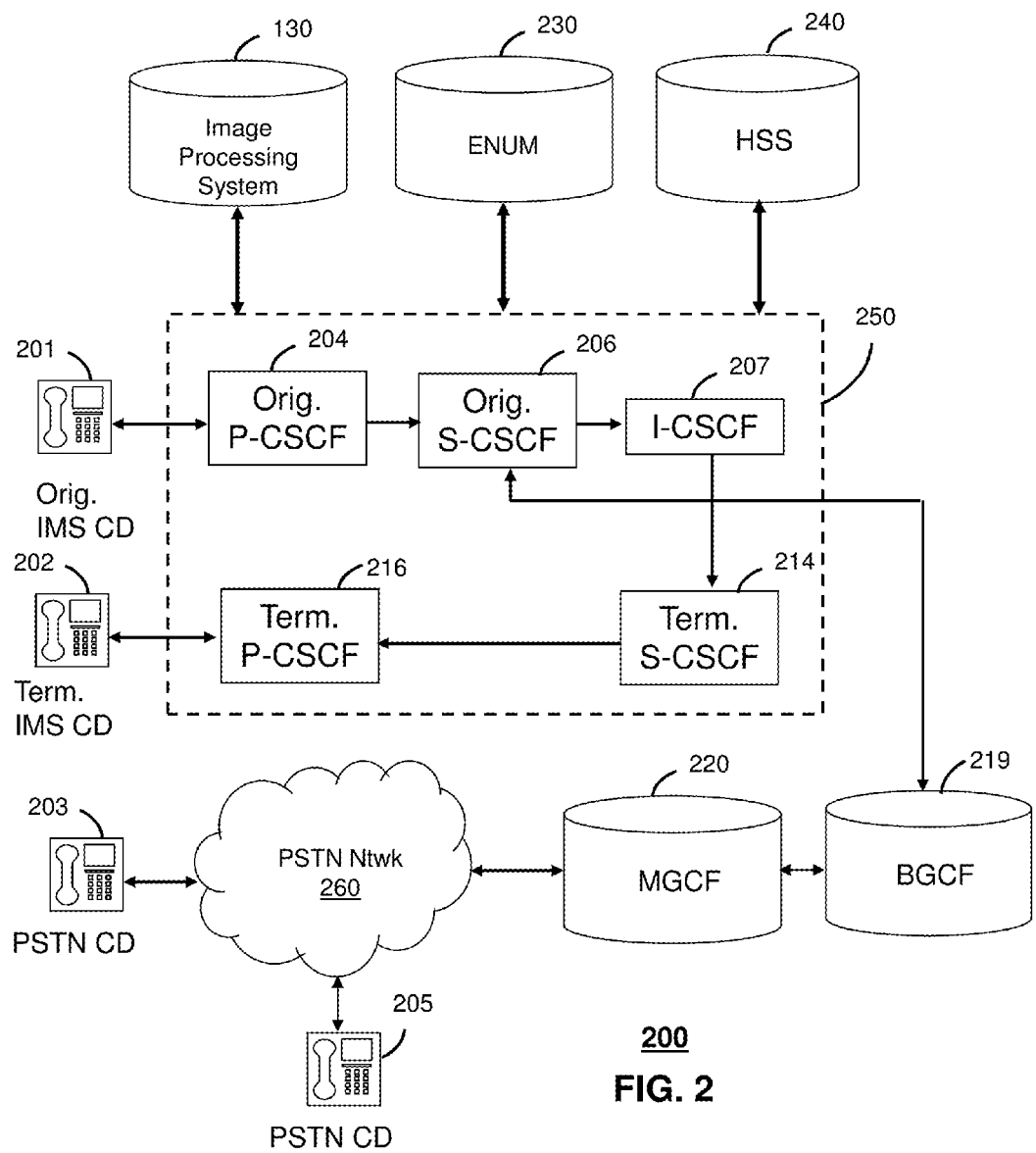

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is not used when a communication session involves IMS CD to IMS CD communications. Any communication session involving at least one PSTN CD requires the use of the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201, 203 the multimedia and Internet services of communication system 100.

The image processing system 130 of FIG. 1 can be operably coupled to the second communication system 200 for purposes similar to those described above.

Figure 3:
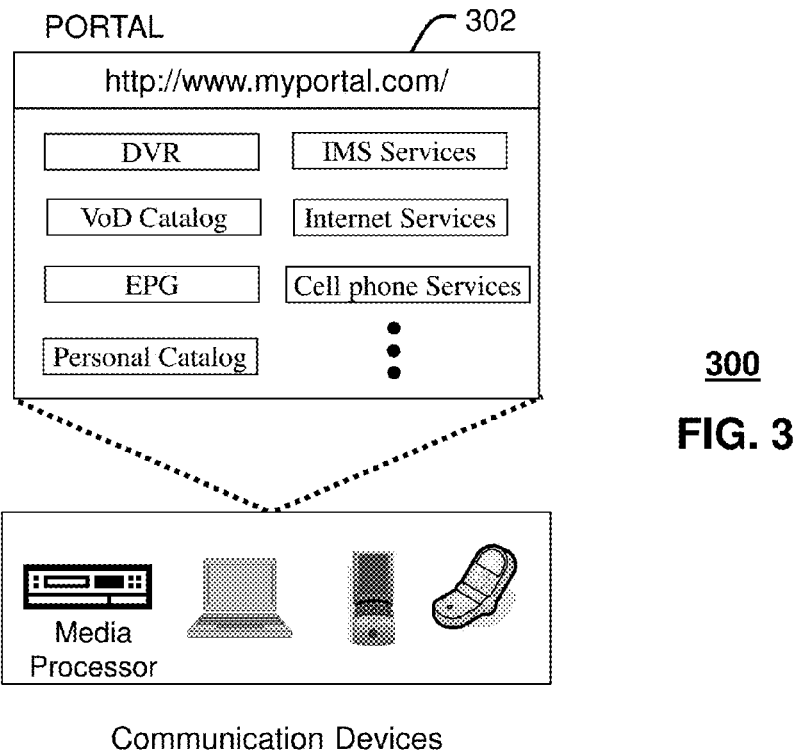
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
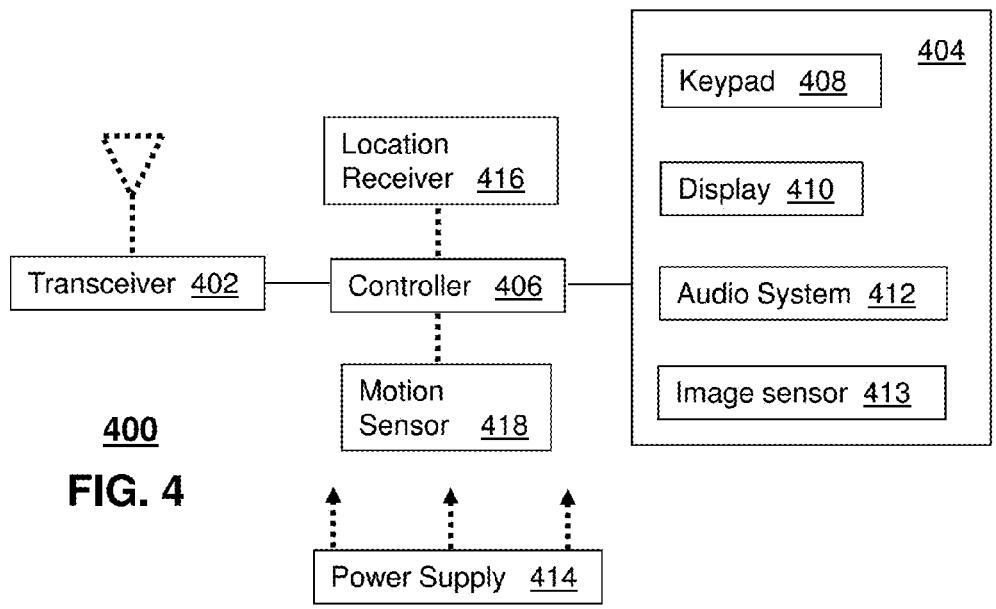
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, a motion sensor 418, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation. The motion sensor 418 can comprise common technology such as one or more accelerometers and/or gyro sensors which can be used to detect motion, orientation and three-dimensional positioning in space. Motion data generated by the motion sensor 418 can be shared with other devices as will be described below.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
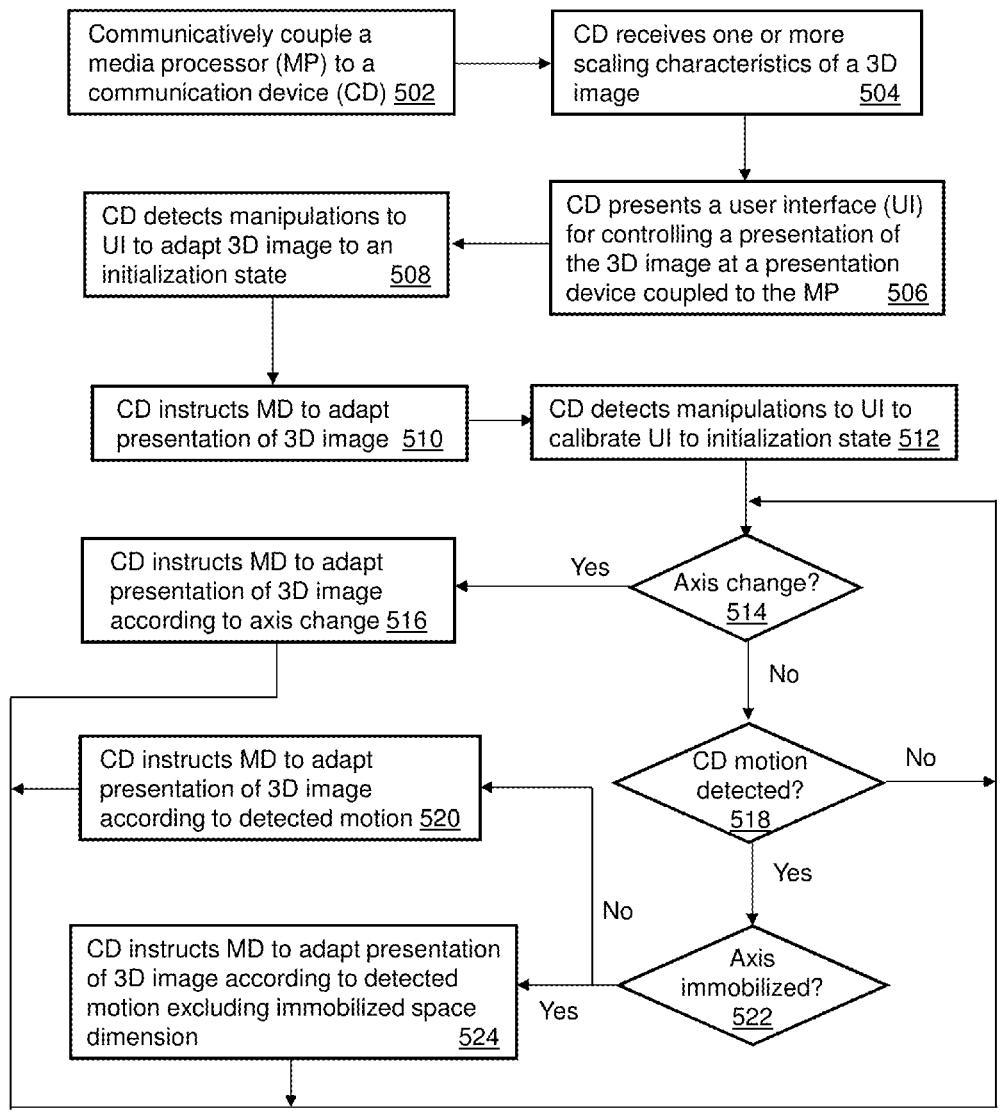
FIG. 5 depicts an illustrative embodiment of a method operating in portions of the communication systems of FIGS. 1-2.
Figure 6:
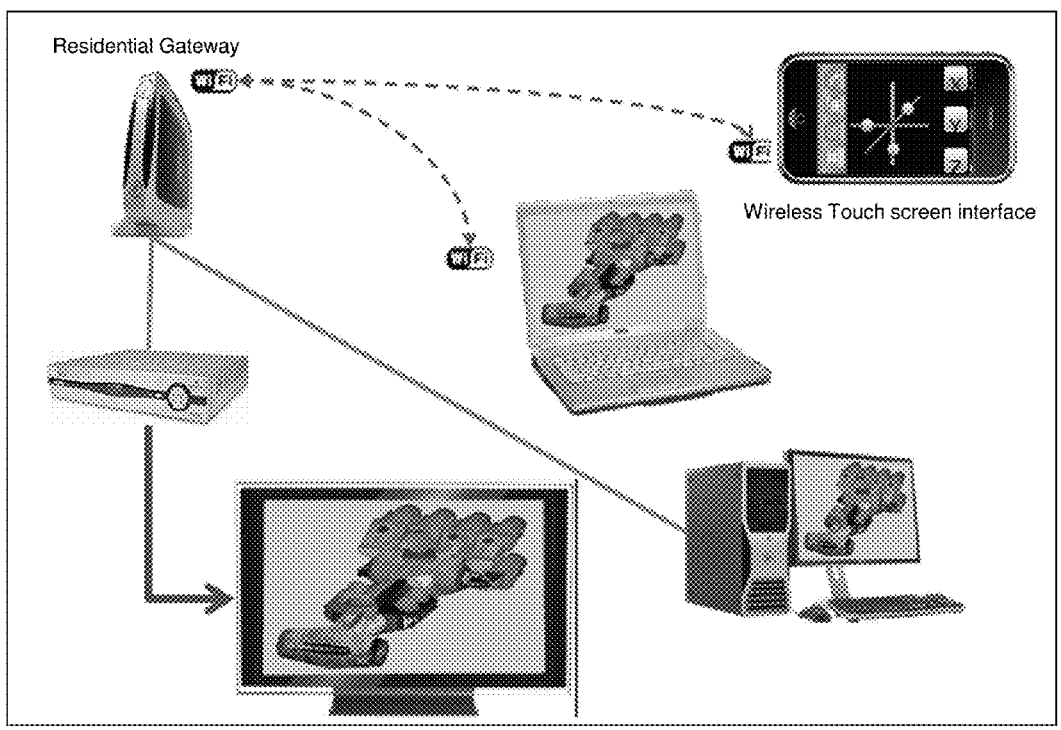
Figure 7:
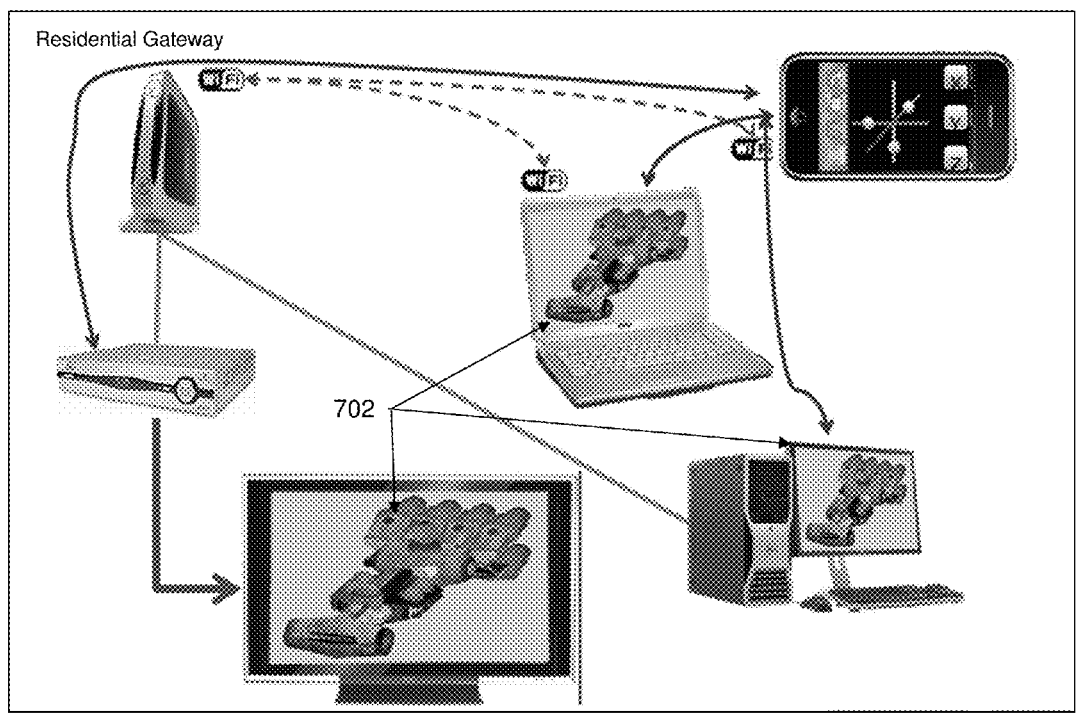

FIG. 5 depicts an illustrative method 500 that operates in portions of the devices illustrated in FIGS. 1-4. FIGS. 6-18 present illustrative embodiments of method 500. FIG. 6, for example, presents a residential gateway coupled to an STB communicatively coupled to a presentation device (e.g., HDTV), a laptop computer, a desktop computer with a monitor, and a mobile communication device—similar to the devices described in FIG. 1. These devices can communicatively coupled to each other by a tethered interface (e.g., USB cable, HDMI cable, etc.), or by a wireless interface such as WiFi, cellular, and so on. Method 500 describes embodiments in which the mobile device can be viewed as communicating with the STB, the laptop computer, or the desktop computer by way of the residential gateway utilizing the WiFi interface as shown in FIG. 7. Other configurations are possible and therefore contemplated by the present disclosure.

With this in mind, method 500 can begin with step 502 in which a media processor 106 is communicatively coupled to a communication device 116. The media processor 106 can represent the STB, the laptop computer, or the desktop computer of FIGS. 6-7. The communication device 116 can be represented by the wireless touch-screen mobile device of FIGS. 6-7. For illustration purposes only, the media processor 106 will be referred to herein as STB 106, while the communication device 116 will be referred to herein as mobile device 116 with an understanding that other embodiments are contemplated by the present disclosure. Once the STB 106 and the mobile device 116 have established communications in step 502 over for example the WiFi interface, the mobile device 116 can receive one or more scaling characteristics of a three-dimensional (3D) image 702 such as shown in FIG. 7. The 3D image can originate from media content presented by the STB 106 such as, for example, a gaming application, or from other source of media content that can involve the presentation of 3D images.

Figure 8:
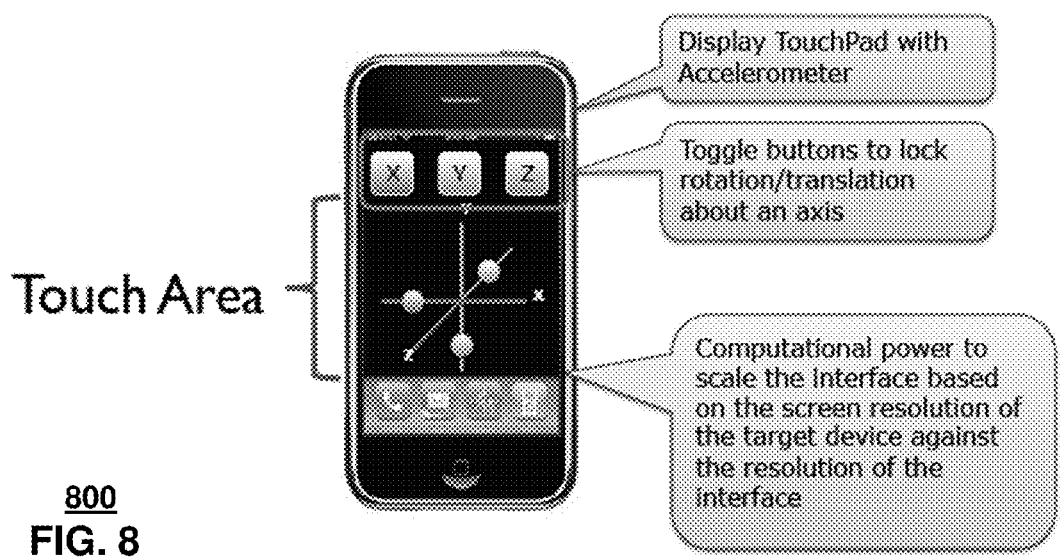
Figure 9:
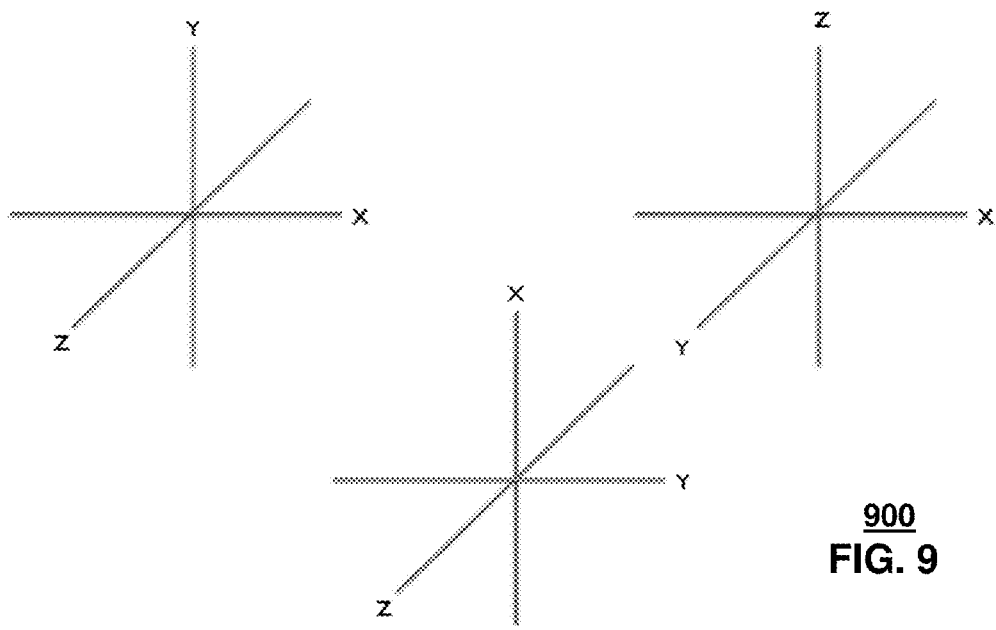

To control the presentation of the 3D image 702 at the presentation device coupled to the STB 106 (herein referred to as TV 108), the mobile device 116 can be operable to present in step 506 a user interface (UI) from a touch-screen display of the mobile device 116. FIGS. 8-11 present illustrative embodiments of the UI. FIG. 8, for example, depicts a mobile device 116 that presents a UI with selectable toggle buttons for x, y, and z axes depicted below the buttons. The x, y and z axes can be depicted in any orientation as shown in FIG. 9. Each of the x, y and z axes can include a selectable object (e.g., a 2D or 3D sphere) such as shown in FIG. 10, which can be slidably controlled on an axis by a finger that slides across the touch-screen display of the mobile device 116 in line with the axis in question as shown in FIG. 12. FIG. 11 illustrates that the UI can be oriented in portrait or landscape mode by a detectable orientation of the mobile device 116 using the motion sensor 418.

Upon receiving scaling characteristics of the 3D image 702 in step 504, the mobile 116 can scale the UI to the scaling characteristics supplied by the STB 106. The scaling characteristics can include among other things 2D or 3D dimensions of the 3D image, 2D or 3D perspectives of the 3D image, shading characteristics of the 3D image, and a color scheme of the 3D image. There may be other characteristics which may be suitable for scaling the UI to the 3D image 702, which are contemplated by the present disclosure. Upon scaling the UI to the 3D image 702, the UI can be manipulated in step 508 to calibrate or initialize the presentation of the 3D image 702 to a desired initialization state definable by the user of the mobile device 116.

FIG. 12 illustrates a UI manipulation with one finger. In this illustration, the mobile device 116 can be adapted to detect an attribute from the manipulation, particularly the presence of one finger. The detected finger informs the mobile device 116 that a user desires to manipulate the slidable object of a single one of the x, y, and z axes (in this illustration the y axis) as shown in FIG. 12. With two fingers, the mobile device 116 can be adapted to control all three axes simultaneously as shown in FIG. 13, or two axes if one of the axes is immobilized by selecting the toggle button of the x, y or z axis. These manipulations can cause the 3D image to zoom in, zoom out, rotate, change perspective, and so on. While UI manipulations are occurring, the mobile device 116 can instruct the STB 106 in step 510 how it is to adapt the presentation of the 3D image 702. The instructions supplied by the mobile device 116 to the STB 106 can include for example coordinate data which can be used by the STB 106 to adapt the presentation of the 3D image 702 at the TV 108.

Once the user has achieved a desired initialization state (e.g., positioning, perspective, zoom state, etc.) of the 3D image 702, the user can designate in step 512 this state as a desired calibration state by sliding three fingers on the touchscreen display as shown in FIG. 14. The calibration (or initialization) state can be used as a starting point for manipulating the 3D image 702 when an application that generates the 3D image has been engaged. For instance, the application that generated the 3D image 702 may be a gaming application, and steps 504-512 can be used prior to engaging in a game with other players or automated players (generally referred to as CPUs).

Once calibration has been achieved in step 512, the mobile device 116 can be operable to detect an axis change in step 514, and/or three-dimensional (3D) motion data generated by the motion sensor 418 (with accelerometers and/or digital gyros) of the mobile device 116 in step 518. If an axis change is detected in step 514 by sliding a finger on the slidable object of the x, y or z axis, the mobile device 116 can proceed to step 516 where it instructs the STB 106 to adapt the presentation of the 3D image 702 according detected change in position of the slidable object in a given axis. This adaptation can represent a zoom in or zoom out adaptation of the 3D image 702 as shown in FIG. 18, an upward or downward repositioning of the 3D image 702, or a left to right or right to left repositioning of the 3D image 702. If two fingers are used, the presentation of the 3D image 702 can be adapted to a multi-axis change as previously described.

If a motion of the mobile device 116 is detected in step 518, the mobile device 116 can proceed to step 522 to determine if the user has immobilized one or more of the x, y and z axes. If all axes are enabled, the mobile device 116 proceeds to step 520 where it instructs the STB 106 to adapt a presentation of the 3D image 702 according to the motion data generated by the motion sensor 418 of the mobile device 116. If one or more of the axes have been immobilized by toggling one or more of the x, y, or z buttons, the mobile device 116 proceeds to step 524 where it instructs the STB 106 to adapt a presentation of the 3D image 702 according to a subset of the motion data generated by the motion sensor 418. For example, if the z axis is immobilized, mobile device 116 can extract only the x and y dimensional data from the motion data and thereby instruct the STB 106 to adapt the presentation of the 3D image 702 with the z-axis immobilized.

Figure 15:
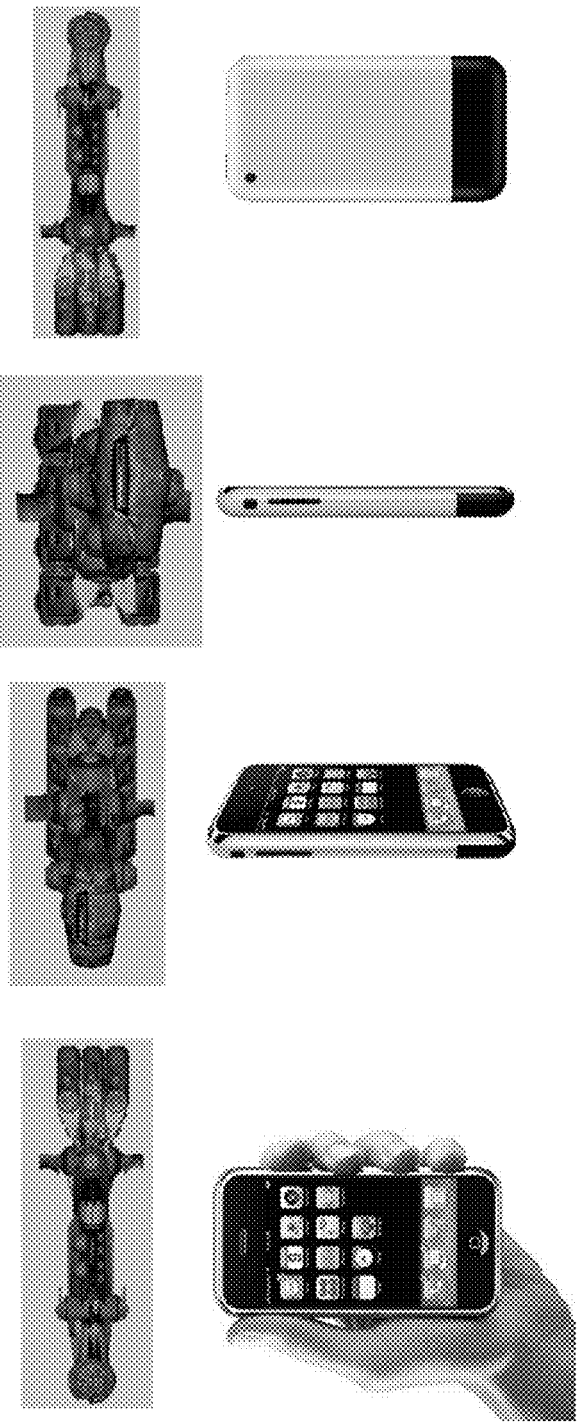
Figure 16:
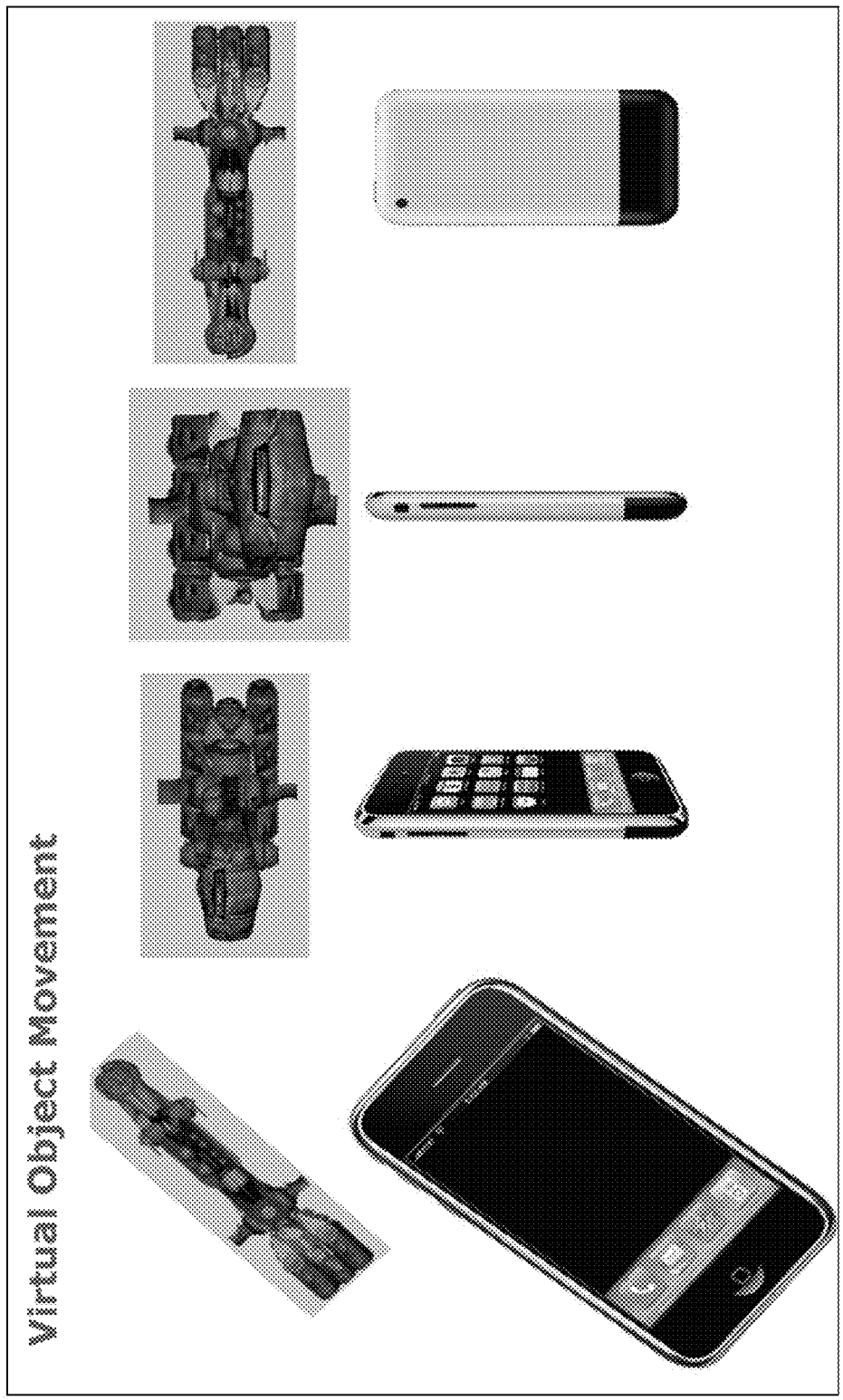

FIG. 15 depicts an illustration in which the z axis is immobilized. In this illustration, rotating the mobile device 116 results in instructions to the STB 106 for rotating the 3D image 702 about the z axis. If a z axis change is detected by the motion sensor 418, it is ignored by the mobile device 116 thereby resulting in the illustration of FIG. 15. FIG. 16 depicts an illustration where none of the axes have been immobilized, thereby enabling all degrees of freedom possible with the motion of the mobile device 116. In this embodiment, any multidimensional movement of the mobile device 116 results in a comparable multidimensional movement of the 3D image 702.

It will be appreciated that method 500 can be supplemented with technology that filters anomalous motion (e.g., jitter) such as when a user is unable to maintain a steady hold of the mobile device 116. Common image processing technology can be used to remove small rapid variations of motion. By filtering anomalous motion from the motion data such as jitter, the mobile device 116 is able to instruct the STB 106 to adapt the presentation of the 3D image 702 in a manner that seems smoother than the user would normally be able to accomplish. It should be noted that filtering anomalous motion would not impede a user to orient and position 3D images 702 as desired.

Upon reviewing the aforementioned embodiments, it would be evident to an artisan with ordinary skill in the art that said embodiments can be modified, reduced, or enhanced without departing from the scope and spirit of the claims described below. For example, method 500 can be adapted so that it is used in real-time while engaged in an interactive 3D image generation application such as a video gaming application. Method 500 can also be adapted to control a presentation of media content at a computer, or other presentation peripheral. Some or the entire image processing functions described by method 500 can be delegated to a network element such as an image processing system 130 of FIGS. 1 and 2. In one embodiment, the mobile device 116 can operate in coordination with the image processing system 130 to instruct the STB 106 (or another computing device with presentation capabilities) to adapt the presentation of the 3D image as described my method 500. Method 500 can also be adapted to control the presentation of 3D images at devices operating in the communication system 200 of FIG. 2.

Other suitable modifications can be applied to the present disclosure without departing from the scope of the claims below. Accordingly, the reader is directed to the claims section for a fuller understanding of the breadth and scope of the present disclosure.

Figure 19:
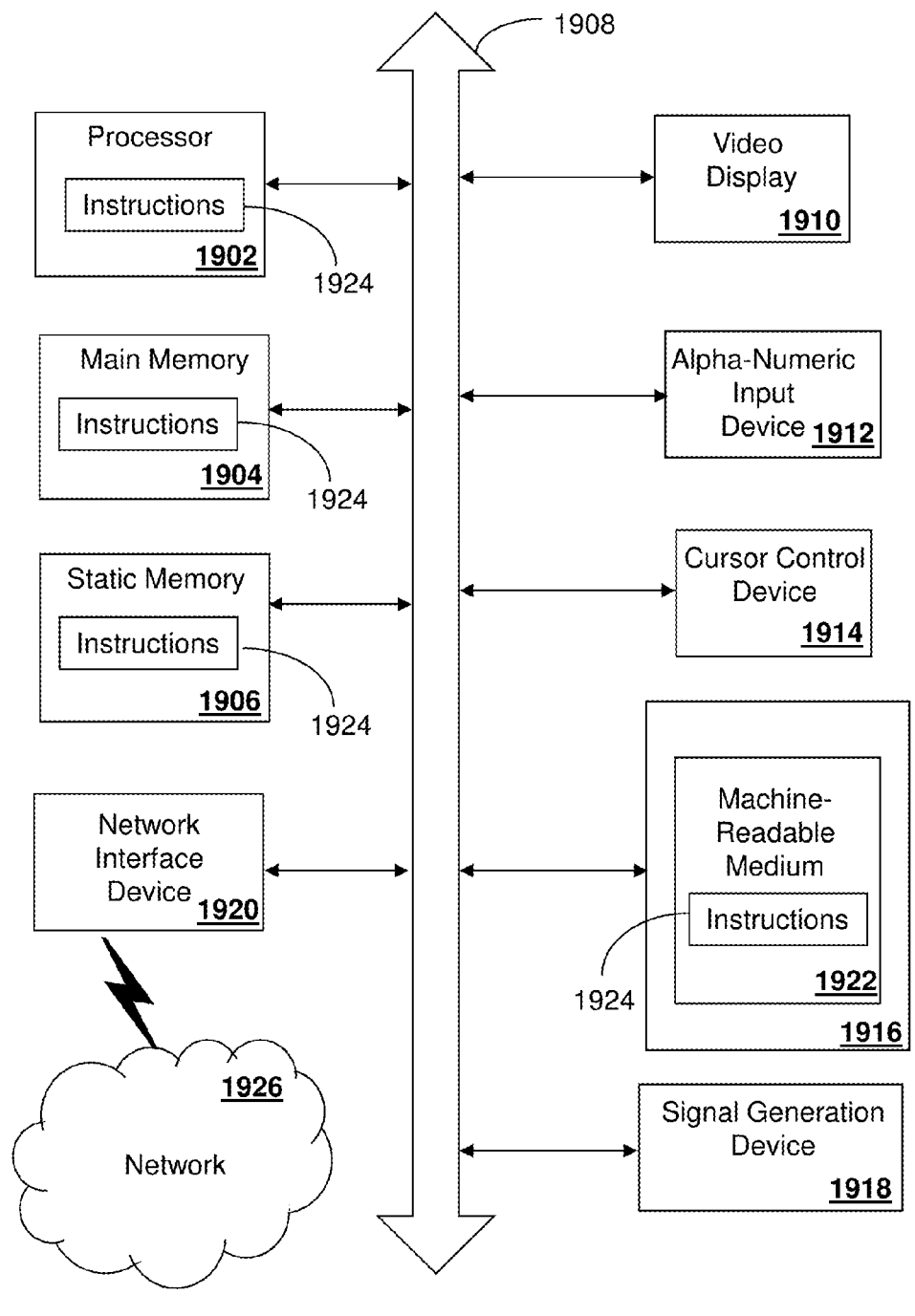
FIG. 19 is a diagrammatic representation of a machine in the form of a computer system within which a set of instructions, when executed, may cause the machine to perform any one or more of the methodologies discussed herein.

FIG. 19 depicts an exemplary diagrammatic representation of a machine in the form of a computer system 1900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1900 may include a processor 1902 (e.g., a central processing unit (CPU), a graphics processing unit (GPU, or both), a main memory 1904 and a static memory 1906, which communicate with each other via a bus 1908. The computer system 1900 may further include a video display unit 1910 (e.g., a liquid crystal display (LCD), a flat panel, a solid state display, or a cathode ray tube (CRT)). The computer system 1900 may include an input device 1912 (e.g., a keyboard), a cursor control device 1914 (e.g., a mouse), a disk drive unit 1916, a signal generation device 1918 (e.g., a speaker or remote control) and a network interface device 1920.

The disk drive unit 1916 may include a machine-readable medium 1922 on which is stored one or more sets of instructions (e.g., software 1924) embodying any one or more of the methodologies or functions described herein, including those methods illustrated above. The instructions 1924 may also reside, completely or at least partially, within the main memory 1904, the static memory 1906, and/or within the processor 1902 during execution thereof by the computer system 1900. The main memory 1904 and the processor 1902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1924, or that which receives and executes instructions 1924 from a propagated signal so that a device connected to a network environment 1926 can send or receive voice, video or data, and to communicate over the network 1926 using the instructions 1924. The instructions 1924 may further be transmitted or received over a network 1926 via the network interface device 1920.

While the machine-readable medium 1922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server comprising:
a memory that stores instructions; and
a controller coupled to the memory, wherein responsive to executing the instructions, the controller performs operations comprising:
providing an application for presentation at a presentation device coupled to the server, wherein presentation of the application comprises presentation of a three-dimensional image;
transmitting to a communication device a scaling characteristic of the three-dimensional image;
receiving instructions from the communication device to adapt the presentation of the three-dimensional image, wherein the communication device presents a user interface to control the presentation of the three-dimensional image according to the scaling characteristic and detects a manipulation of the user interface, and wherein the instructions to adapt the presentation of the three-dimensional image are according to the manipulation of the user interface; and
adapting the presentation of the three-dimensional image responsive to the instructions.

2. The server of claim 1, wherein the application comprises a gaming application, and wherein the adapting comprises controlling an initialization state of the presentation of the three-dimensional image to facilitate engaging in a game.

3. The server of claim 2, wherein the initialization state is a desired initialization state defined by a user of the communication device.

4. The server of claim 2, wherein the manipulation is performed by a user of the communication device prior to engaging in the game with another user or with an automated player.

5. The server of claim 1, wherein the communication device comprises a touch-screen display for presenting the user interface.

6. The server of claim 1, wherein the communication device receives three-dimensional motion data associated with detected motion of the communication device, and wherein the operations further comprise:
receiving instructions from the communication device to adapt the presentation of the three-dimensional image according to a space dimension of the three-dimensional motion data.

7. The server of claim 1, wherein the scaling characteristic comprises a dimension of the three-dimensional image, a two-dimensional perspective of the three-dimensional image, a three-dimensional perspective of the three-dimensional image, a shading characteristic of the three-dimensional image, a color scheme of the three-dimensional image, or a combination thereof.

8. The server of claim 1, wherein the manipulation of the user interface comprises a sliding movement of a finger to control presentation of the three-dimensional image on an x-axis, a y-axis, or a z-axis.

9. The server of claim 1, wherein the adapting is performed in real-time with respect to the presentation of the application at the presentation device.

10. A user interface comprising:
an x-axis with a slidable first object, a y-axis with a slidable second object, and a z-axis with a slidable third object, and
selectable areas for selecting the x-axis, the y-axis, and the z-axis respectively;
wherein the user interface is presented at a communication device coupled to a server to control presentation of a three-dimensional image at a presentation device,
wherein the user interface is presented at a touch-screen display for receiving a stimulus corresponding to a sliding movement of a finger on the touch screen display,
wherein manipulation of the user interface responsive to the stimulus corresponds to an instruction to the server to adapt the presentation of the three-dimensional image at the presentation device, and
wherein the user interface is adapted to a scaling characteristic of the three-dimensional image.

11. The user interface of claim 10, wherein the selectable areas comprise toggle buttons corresponding to the x-axis, the y-axis, and the z-axis respectively.

12. The user interface of claim 10, wherein the user interface is scaled based on a screen resolution of the touch screen display with respect to a resolution of the user interface.

13. The user interface of claim 10, wherein the scaling characteristic comprises a dimension of the three-dimensional image, a two-dimensional perspective of the three-dimensional image, a three-dimensional perspective of the three-dimensional image, a shading characteristic of the three-dimensional image, a color scheme of the three-dimensional image, or a combination thereof.

14. The user interface of claim 10, wherein the server provides a gaming application for presentation at the presentation device coupled to the server, wherein the presentation of the gaming application comprises presentation of the three-dimensional image.

15. The user interface of claim 14, wherein the manipulation of the user interface controls calibration or initialization of the presentation of the three-dimensional image to a user-defined state prior to engaging in a game.

16. The user interface of claim 10, wherein the manipulation of the user interface causes the three-dimensional image to zoom in, zoom out, rotate, change perspective, or a combination thereof.

17. A non-transitory machine-readable storage device, comprising instructions which, when executed by a processor, cause the processor to perform operations comprising:
providing an application for presentation at a presentation device coupled to the processor, wherein presentation of the application comprises presentation of a three-dimensional image;
transmitting to a communication device a scaling characteristic of the three-dimensional image;
receiving instructions from the communication device to adapt the presentation of the three-dimensional image,
wherein the communication device presents a user interface to control the presentation of the three-dimensional image according to the scaling characteristic and detects a manipulation of the user interface,
wherein the instructions to adapt the presentation of the three-dimensional image are according to the manipulation of the user interface, and
wherein the manipulation of the user interface controls calibration or initialization of the presentation of the three-dimensional image.

18. The non-transitory machine-readable storage device of claim 17, wherein the scaling characteristic comprises a dimension of the three-dimensional image, a two-dimensional perspective of the three-dimensional image, a three-dimensional perspective of the three-dimensional image, a shading characteristic of the three-dimensional image, a color scheme of the three-dimensional image, or a combination thereof.

19. The non-transitory machine-readable storage device of claim 17, wherein the application comprises a gaming application, and wherein the manipulation is performed by a user of the communication device prior to engaging in a game with another user or with an automated player.

20. The non-transitory machine-readable storage device of claim 17, wherein the adapting is performed in real-time with respect to the presentation of the application at the presentation device.

* * * * *